(No Model.)
A. SMITH.
APPARATUS FOR COOLING WATER IN THE MANUFACTURE OF ICE.
No. 483,397. Patented Sept. 27, 1892.
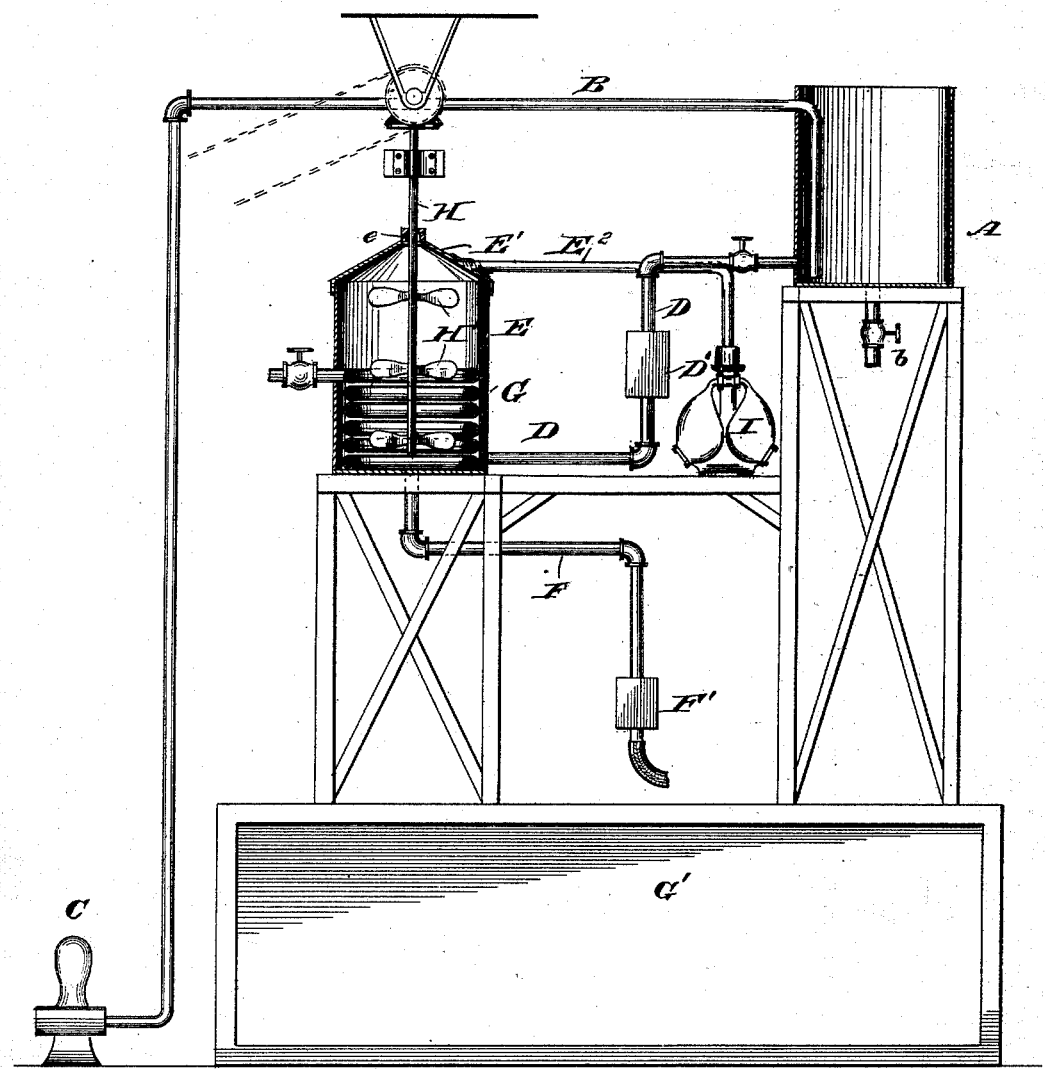
WITNESSES:
INVENTOR:
A. Smith
BY
Munn & Co
ATTORNEYS.

UNITED STATES PATENT OFFICE.

ALBERT SMITH, OF COLORADO SPRINGS, COLORADO.

APPARATUS FOR COOLING WATER IN THE MANUFACTURE OF ICE.

SPECIFICATION forming part of Letters Patent No. 483,397, dated September 27, 1892.

Application filed March 10, 1892. Serial No. 424,407. (No model.)

*To all whom it may concern:*

Be it known that I, ALBERT SMITH, of Colorado Springs, in the county of El Paso and State of Colorado, have invented certain new and useful Improvements in Apparatus for Cooling Water in the Manufacture of Ice, of which the following is a full, clear, and exact description.

The invention relates to a means for cooling and filtering the water from which ice is to be made preliminary to delivering the water to the freezing-cans.

The invention consists in the novel features hereinafter particularly described, and defined in the claim.

Reference is to be had to the accompanying drawing, forming a part of this specification, in which the figure represents in elevation that portion of an ice-making apparatus to which the invention relates, parts being shown in vertical section.

The storage-tank A receives its supply of water from any suitable source, as from the delivery-pipe B of a pump C, and in this tank A, I precipitate by suitable chemicals any solid or foreign matter that may be in the water, a pipe $b$ being provided at the bottom for allowing the settled dirt, &c., to escape when desired.

From the tank A a pipe D leads to a cooling-tank E, a filter D' of any suitable construction being arranged in connection with pipe D between the tanks A and E, and from the tank E the water is delivered by a pipe F to the usual cans (not shown) in the freezing-tank, a filter F' being arranged in connection with said pipe F. The cooling-tank E has a coil G, which is supplied with brine from the freezing-tank G' by a pump (not shown) or other means for cooling the water surrounding such coil. A vertical shaft H is also arranged in tank E and carries radial agitating-blades H', preferably in the form of propeller-blades, the same being so disposed as to cause an upward current of the water. This agitator-shaft may be driven and supported in any suitable manner, the arrangement shown being merely for the purpose of showing the application of the invention. The top E' of the cooling-tank is closed airtight, and at its upper end is a stuffing-box $e$ for the shaft H. The arrangement is such that as the agitator is slowly revolved the water will be gently agitated, so as to more thoroughly subject it to the action of the cooling-coil G and also better enable it to give off its air, the air-bubbles disengaging themselves as the water is successively moved upward. From the upper end of the tank E a pipe $E^2$ leads to a vacuum-pump I, of any approved form, which exhausts the air from above the water in the tank, whereby the water will be practically freed from air before passing to the cans. By this means, also, the water will be freed from impurities and will have its temperature reduced preparatory to being delivered to the cans.

Having thus fully described my invention, I claim as new and desire to secure by Letters Patent—

In an ice-making apparatus, the combination, with the water-cooling tank E, of the agitator consisting of the vertical rotatable shaft H, having radial blades H', the brine-conducting coil G, surrounding said agitator, and the vacuum-pump connected with the top of the cooling-tank, as shown and described.

ALBERT SMITH.

Witnesses:
ELLIS L. SPACKMAN,
EUSTACE SUMNER.